United States Patent [19]

Fernandez-Holmann

[11] Patent Number: 5,787,404

[45] Date of Patent: Jul. 28, 1998

[54] CREDIT-CARD BASED RETIREMENT FUND SYSTEM AND METHOD

[76] Inventor: Ernesto Fernandez-Holmann, Apartado Postal 928-A, Lona 01010, Guatemala

[21] Appl. No.: 561,617

[22] Filed: Nov. 21, 1995

[51] Int. Cl.⁶ .................................................. G06F 17/60
[52] U.S. Cl. .............................. 705/35; 705/17; 705/37; 705/40
[58] Field of Search ........................ 395/238; 705/17, 705/35, 39, 40

[56] References Cited

U.S. PATENT DOCUMENTS

| | | |
|---|---|---|
| 4,750,119 | 6/1988 | Cohen et al. |
| 4,969,094 | 11/1990 | Halley et al. |
| 5,056,019 | 10/1991 | Schultz et al. |
| 5,200,889 | 4/1993 | Mori |
| 5,206,803 | 4/1993 | Vitagliano et al. |
| 5,287,268 | 2/1994 | McCarthy |

OTHER PUBLICATIONS

Colter, G.; Smart Money Hesitates Beford Fidelity Offer; New Credit Card Helps Users Purchase Firm's Funds; Buyer Beware; Some Say; The Wall Street Journal; May 27, 1994; Sec. B; p. 46.

Sokol, M.; Credit Card Limits Tied To Life Insurance Equity; Knight Rider Newspaper; Five Star; Sec. Ins, p. 9; Jan. 27, 1988.

"Cellular One and Mobilepay Makes Cellular Simple", PR Newswire, Oct. 12, 1994.

N.Y. Times Article, "A Card for Borrowing From Yourself", Aug. 27, 1995, p. 6.

*Primary Examiner*—Robert A. Weinhardt
*Assistant Examiner*—William N. Hughet
*Attorney, Agent, or Firm*—Anthony R. Barkume

[57] ABSTRACT

A method and system for providing an investment fund, such as a long term investment fund which may be suitable for retirement purposes, comprising the steps of establishing a credit based account with a credit card issuer for the benefit of a credit card holder, providing an investment account with a financial institution for the benefit of the credit card holder, funding the investment account by the credit card issuer with a predetermined amount of money on a periodic basis, and charging an amount of money so funded against the credit based account of the credit card holder. In addition, disclosed is a method and system providing an investment fund is based on purchase rebates, comprising the steps of establishing a credit based account with a credit card issuer for the benefit of a credit card holder, providing a long term investment account with a financial institution for the benefit of the credit card holder, ascertaining the total amount of money charged by the credit card holder in subscriber merchants in a particular period of time, and providing a rebate by the credit card issuer to the credit card holder by funding the investment account of the credit card holder with a predetermined percentage of said total amount so ascertained.

12 Claims, 5 Drawing Sheets

CREDIT-CARD BASED RETIREMENT FUND SYSTEM AND METHOD

BACKGROUND OF THE INVENTION

The present invention relates to the funding of investment accounts such as long term investment accounts which may be suitable for use in retirement or pension plans, and in particular to a credit card based funding system which uses automatic credit-based funding or rebate-based funding of the investment account.

Investment accounts such as retirement accounts or pension plans are implemented in order to provide people with long term savings which will enable them to retire with monetary funds sufficient to support them. Various financial vehicles have been utilized in order to provide incentive to people to save or invest money for such retirement, and these financial vehicles are often of a tax free or tax deferred nature such as an Individual Retirement Account (IRA), a 401(k) account, a Keogh plan, and the like.

Often, due to current financial constraints, consumers are lacking in the discipline required to fund such a retirement account on a regular basis. An automatic payment method, which relieves the consumer of the burden of having to proactively deposit funds every month, is in popular use today in the form of a payroll deduction which funds a 401(k) account. Once a worker selects this option, a certain percentage of his pay is deducted from his periodic salary payment and deposited with a preselected investment account.

A necessary incident to the discipline of automatic monthly payroll deductions is the inflexibility and potential hardship on the cash flow of a consumer. In many cases, the money dedicated to the payroll deduction may be needed for emergency or quasi-emergency purposes. Although current 401(k) accounts allow some liquidity (i.e. the consumer may borrow against his own account), the consumer often requires more payment flexibility than is currently afforded.

Furthermore, not all consumers or workers are able to utilize such an automatic payroll deduction mechanism, since not every employer offers such a plan, many people are self-employed or work for small companies, people often change employers, etc. Moreover, the plan choices offered by the employers are often limited and may not fulfill the needs of the consumer in terms of investment type, risk, return on investment, liquidity, etc.

There is therefore a need for a system which will provide for the automatic funding of a retirement or pension plan account which is not dependent on the workers employment situation and which allows flexibility in cash flow for the consumer while maintaining a certain degree of discipline in savings.

In addition, there has been disclosed in the prior art the use of a rebate program for funding a bank account. U.S. Pat. No. 5,287,268 to McCarthy teaches a system wherein point-of-sale transactions at selected merchants are tracked for a particular consumer. A portion of the transaction amounts are credited to the consumer's account. This type of system is disadvantageous since particular merchants are required to be associated with the system, and the consumer may only make purchases at those merchants in order to receive the rebate into his account.

There is therefore a need for a system which will provide incentives to the user to make purchases in order to fund, via percentage rebates, a long term investment account such as a retirement account or pension plan.

It is therefore an object of the present invention to provide a system and method of funding an investment account which overcomes the aforementioned problems of the prior art.

It is an object of the present invention to provide such a system which provides for automatic and periodic credit-based funding of an investment account so as to relieve the consumer of the need to provide funds to the account on his own volition.

It is a further object of the present invention to provide such a system which allows the consumer to repay the funding institution on flexible periodic terms so as not to overburden cash flow problems the consumer may have.

It is still further object of the present invention to provide such a system which gives the consumer automatic rebate-funded payments into his investment account which do not need to be repaid and which are based on purchase of goods or services made by the consumer, and which is not dependent on merchants or stores becoming members of the particular rebate plan.

SUMMARY OF THE INVENTION

In accordance with these and other objects, provided is a method and system for providing an investment fund such as a long term investment fund suitable for retirement purposes. The method comprises the steps of establishing a credit based account with a credit card issuer for the benefit of a credit card holder, providing an investment account with a financial institution (which could be a bank, savings and loan association, mutual fund, insurance company, broker-dealer, credit union, or any other entity authorized by law to accept deposits from, or sell investments to, the general public) for the benefit of the credit card holder, funding the investment account by the credit card issuer with a predetermined amount of money on a periodic basis, and charging an amount of money so funded against the credit based account of the credit card holder. Optionally, the credit card issuer may fund the account only when the credit card holder has not independently funded the investment account in a particular period. A fee such as a service charge or interest may be charged against the credit based account of the credit card holder when the credit card issuer funds the investment account in any given period.

In addition, the credit card holder may be billed by the credit card issuer for the amount of money funded to the investment account. Funding of the investment account by the credit card issuer is terminated when the credit card holder defaults by failing to make timely payment of at least a predetermined portion of the amount billed by the credit card issuer in any particular period. Upon such default, in certain instances funds may be transferred from the investment account to the credit card issuer to cover the amount of money owed by the credit card holder to the credit card issuer due to the default.

In an alternative embodiment of the present invention, which may be implemented separately or in conjunction with the automatic credit-based funding plan described above, a method and system for providing a credit-based investment fund such as a long term investment fund suitable for retirement purposes is based on purchase rebates. The method comprises the steps of establishing a credit based account with a credit card issuer for the benefit of a credit card holder, providing a long term investment account with a financial institution for the benefit of the credit card holder, ascertaining the total amount of money charged by the credit card holder in subscriber merchants in a particular period of time, and providing a rebate by the credit card issuer to the credit card holder by funding the investment account of the credit card holder with a predetermined percentage of said total amount so ascertained.

Transfers of money into and out of investment accounts which are long term and intended for retirement purposes may have income tax considerations which may constrain the ability of the credit card holder and/or the credit card issuer to deposit and/or withdraw or borrow funds to or from the investment account.

The advantages to the use of the methods and systems described above will become apparent by the detailed description below, but suffice it to say in summary fashion that the use of a credit card account for funding the consumer's investment account provides the discipline in savings often desired by the consumer in funding his or her retirement fund since a third party, i.e. the credit card issuer, automatically makes the required periodic payments to the investment account and bills the consumer accordingly along with the purchase charges normally incurred by the consumer. While affording such disciplined savings, the present invention also allows for cash flow contingencies by providing that the consumer may make a small minimum payment in a given month rather than having to remit the entire amount. As such, the consumer's investment account is regularly deposited, yet the consumer has cash flow flexibility in accordance with his or her needs. Moreover, the consumer has more options in the type of investment vehicle implemented, and does not have to depend on his employer's choice of plan.

In the rebate-funded aspect of the invention, the consumer is given an incentive to utilize the credit card, since the investment account will be increased as a percentage of the consumer's purchases with the credit card. The vast credit card network already in commercial use allows the present invention to be implemented without requiring merchants to become members in a separate rebate program, and the invention is thus transparent to the merchants and is managed only by the credit card issuer.

DETAILED DESCRIPTION OF THE PREFERRED EMBODIMENT

Figure 5:
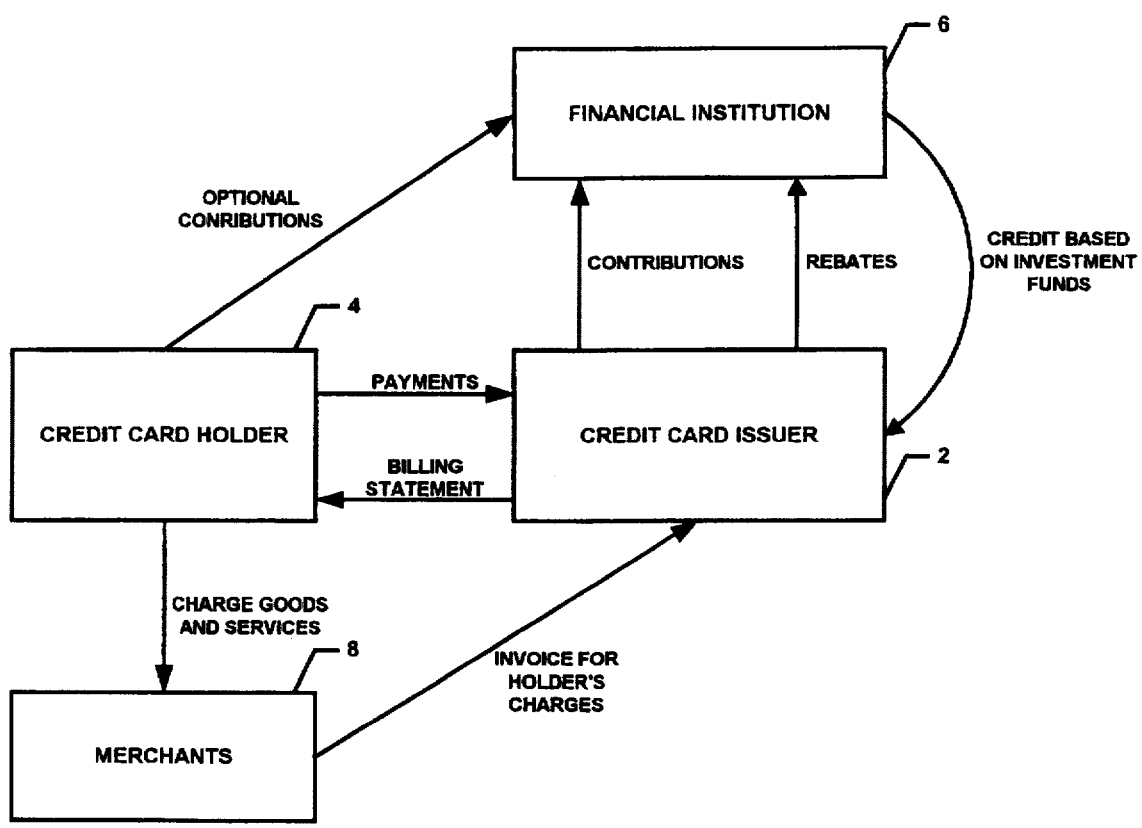
FIG. 5 is a block diagram of the system of the present invention.

With reference to the Figures herein, the preferred embodiment of the present invention will now be described in detail. FIG. 5 shows a block diagram of the system components of the preferred embodiment and the transactional interaction therebetween. A credit card issuer 2 provides a credit based account for the benefit of a credit card holder 4. The credit card holder 4 may purchase goods and services with the credit card at merchants 8 which subscribe to the credit card issuer's credit system. The interaction between the credit card issuer 2, the credit card holder 4, and the merchants 8, provides part of the backbone of the present system and is well known in the art. In addition, a financial institution 6 establishes an investment fund for the benefit of the credit card holder 4, into which payments will be made by the credit card issuer 2 in the form of monthly credit-based contributions and/or rebates, as will be described in detail below.

The credit card retirement rebate system may be used by credit card holders, credit card issuers (e.g. banks), and one or more financial institutions, wherein the credit card holders will purchase long term investments or will accumulate long term savings for their retirement. The system allows for the accumulation by the credit card holders of investments for their retirement through monthly contributions, not to exceed a predetermined amount, to the investment account at a financial institution 6 such as a bank, savings and loan association, credit union, broker-dealer, insurance company or other entity which is authorized by law to accept deposits from, or sell investments to, the public. If this monthly contribution has not been received in the investment account from or on behalf of the credit card holder 4 by a predetermined date and time (e.g. fifteenth of the month), it will be automatically made by the credit card issuer 2 on behalf of the credit card holder 4 on the next business day by debiting the credit card holder's credit card account with the credit card issuer 2 for that amount, together with the reasonable costs of the credit card issuer 2 in making the transfer, then transferring the monthly contribution to the investment account on behalf of the credit card holder 4. Any amount so debited by the credit card issuer 2 against the holder's credit card account will be subject to the same terms and conditions as any other amount the credit card holder 4 may then owe the credit card issuer 2 on such credit card.

Figure 1:
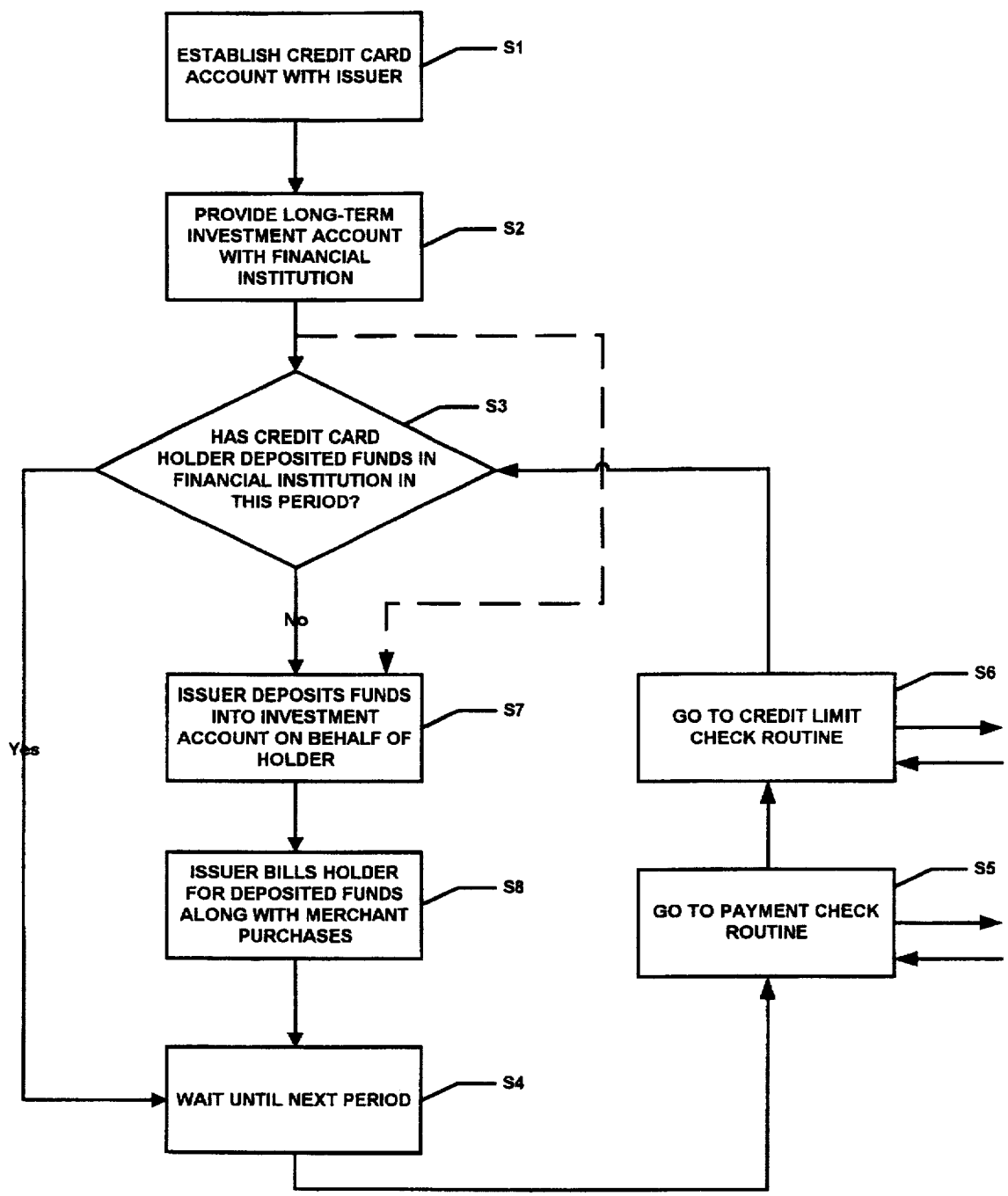
FIG. 1 is a flowchart of a method which implements the credit card based periodic payment methodology of the present invention.

This process is carried out by first establishing a credit card account with a credit card issuing entity, which is often a bank or other financial institution 6, for the benefit of the credit card holder 4, as shown in FIG. 1 as step S1. The credit card account is established in any manner known in the prior art, and likely will require an investigation of the creditworthiness of the credit card holder 4. The credit card account may or may not have a preset spending limit or credit line, depending on the requirements of the particular issuing entity.

At step S2, an investment account is established with a financial institution 6 for the benefit of the credit card holder 4. This may be a long-term investment account suitable for retirement purposes, such as an Individual retirement Account (IRA), 401(k) plan or the like. An existing retirement or investment account may be used if desired by the credit card holder 4. The credit card holder 4 may need to provide authorization to the financial institution 6 indicating that the credit card issuer 2 may transfer funds out as well as into the account, which may be required if an automatic reimbursement option is implemented in case of default by the credit card holder 4, which will be explained in detail below.

Each financial institution 6 where an investment account is located may set different terms and conditions for such investment account, including any rate of return offered on such investment account, the nature of the products available through such investment account, the availability to the credit card holder 4, through loans or otherwise, of funds accumulated in the investment account, and any restrictions on the credit card holder's withdrawal of funds from such investment account. To the extent that tax-free accumulation of the investment account is desired, these conditions may be subject to requirements established by applicable law from time to time.

At step S3, an inquiry is made to determine whether the credit card holder 4 has deposited funds with the financial institution 6 for a given period of time, for example in a particular month. If the answer to this inquiry is affirmative, then the issuer 2 waits at step S4 until the next monthly period and performs a payment check routine at step S5 and a credit limit check routine at step S6, which are explained in detail below.

If the answer to the inquiry at step S3 is negative, then the credit card holder 4 has not made the monthly contribution and the credit card issuer 2 proceeds to step S7, where the credit card issuer 2 deposits funds into the investment account on behalf of the credit card holder 4. At ensuing step S8, the credit card issuer 2 bills the credit card holder 4 for the deposited funds along with the purchases made at credit card merchants in the usual fashion.

Optionally, the inquiry step S3 may be deleted and the credit card issuer 2 may automatically fund the investment account each month, thus relieving the credit card holder 4 of any need to provide such independent funding. In this case, the dotted line indicates the process which omits step S3.

Figure 2:
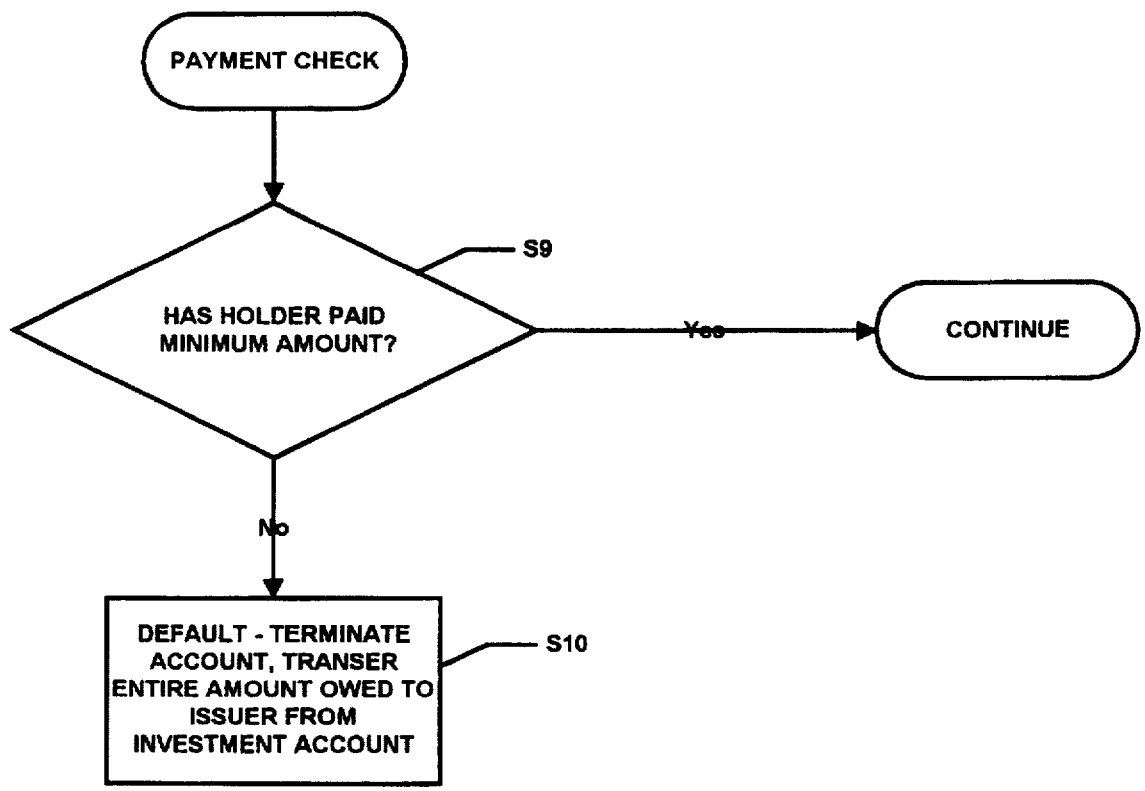
FIG. 2 is a flowchart of a subroutine which performs a payment check.

The process then proceeds to steps S4, S5, and S6, where the next period is waited for and a payment check routine and a credit limit check routine are performed, respectively. The payment check routine is shown by the flowchart in FIG. 2, where an inquiry is made at step S9 to determine if the credit card holder 4 has paid the required minimum amount from the previous billing statement. If he has made such minimum payment, then the process continues to step S6; if not, then the credit card holder 4 is in default as shown in step S10.

Figure 3:
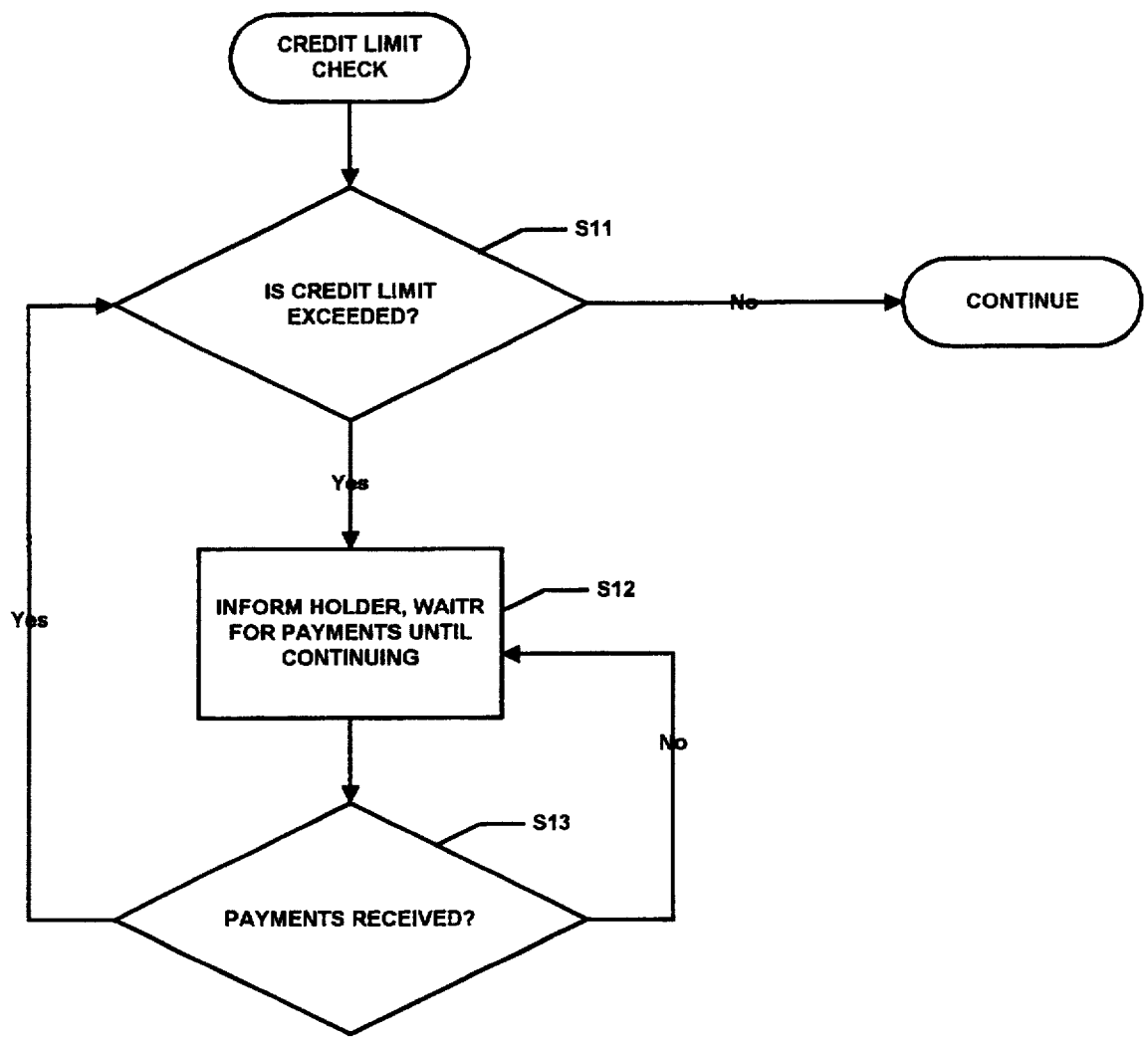
FIG. 3 is a flowchart of a subroutine which performs a credit limit check.

The credit limit check routine is shown by the flowchart of FIG. 3, where an inquiry is made at step S11 to determine if the credit limit has been exceeded by the credit card holder 4. If the answer to this inquiry is negative, then the process continues to step S3 as set forth above. If the holder 4 has exceeded his credit limit, then the holder 4 is informed via step S12 that the credit limit has been exceeded and the system enters a wait state, waiting for the requisite payment of a minimum amount as shown by the loop of steps S13 and S14. When such minimum payment has been received and the credit limit is not thereby exceeded, the routine is exited and the process continues to step S3 as set forth above.

The rebate aspect of the invention, which may be performed in conjunction with or independent from the automatic credit card issuer funding aspect of the invention just described, will now be described with reference to FIG. 4. In this aspect, the credit card issuer 2, on or before a certain date and time (e.g. the twelfth of the month), will tabulate the credit card holder's aggregate use of the credit card for purchases in the preceding calendar month (excluding any interest or charges which may accrue on the credit card account, as well as any monthly contribution made by the credit card issuer 2 in such month on behalf of the credit card holder 4), then either together with the transfer referred to above, or separately, transfer as a rebate for such credit card use, to the investment account, an amount equal to a predetermined percentage of the aggregate amount of such usage, with an also predetermined cap. The percentage may vary depending on the amount of purchase charged to the credit card. This rebate will not be debited to the holder's credit card account, nor will the credit card account be charged for the cost of transferring the rebate to the investment account. Instead, the rebate will constitute the credit card holder's reward for use of the credit card over the immediately preceding calendar month.

Figure 4:
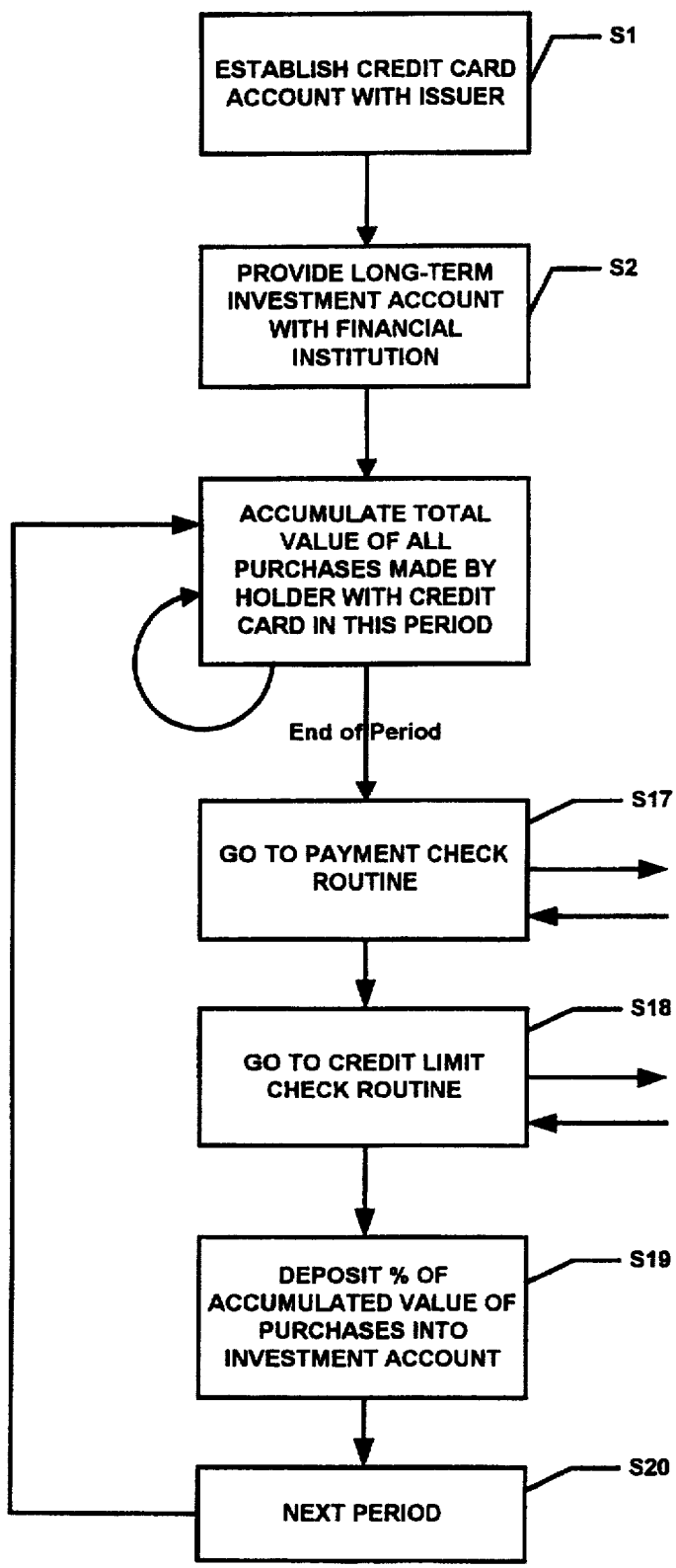
FIG. 4 is a flowchart of a method which implements the credit card rebate based payment methodology of the present invention.

As shown in FIG. 4, the steps of establishing a credit card account with the credit card issuer 2 and providing a long term investment account with the financial institution 6, as shown by steps S1 and S2, which are the same as described with reference to FIG. 1, are provided. The total value is accumulated of all purchases made by the credit card holder 4 with the credit card in a given period at step S16. This step continues until the end of the billing period, which is typically monthly, at which point the [payment check routine of FIG. 2 and the credit check routine of FIG. 3 are executed, as denoted by steps S17 and S18, respectively. Should these steps allow, the process is then continued at step S19 by the deposit into the credit card holder's investment account from the credit card issuer 2 of a percentage, e.g. 2%, of the accumulated value of the credit card holder's purchases for the period. The next period is entered via step S20, and step S16 is executed, etc.

As mentioned, the rebate aspect of FIG. 4 may be combined with the automatic credit based funding aspect of FIG. 1, in which case the processes exemplified therein are easily run in parallel, with like steps and routines executed accordingly.

The system of the present invention is intended primarily to assist credit card holders in accumulating savings for retirement purposes. Thus, the system may be implemented in such a manner as to qualify for tax-free treatment on accumulations in the investment account over a long term period, by adhering to the necessary rules for an IRA, a 401(k) plan, or any other savings or investment vehicle which could by lawfully entitled to a tax free accumulation.

The credit card issuer's obligation to make a monthly contribution or a rebate on behalf of a credit card holder 4 will not apply in any calendar month in which the credit card holder 4, at the time such monthly contribution or rebate would otherwise be made, has not fully performed all of the credit card holder's obligations with respect to the credit card. If, in making any such monthly contribution on behalf of a credit card holder 4, the credit card issuer 2 would exceed the applicable borrowing limit for the credit card holder 4 under the credit card, the amount contributed by the credit card issuer 2 as the monthly contribution shall be such lesser amount as will not cause such limit to be exceeded.

If at any time the credit card issuer 2 discontinues the credit card holder's use of the credit card due to the credit card holder's non-performance of its obligations in respect of the credit card, or for any other reason permitted under the agreement between the credit card holder 4 and the credit card issuer 2 pertaining to the credit card or otherwise permissible under applicable law, the credit card issuer's obligation to make a monthly contribution, as well as a rebate, will also automatically terminate. Should the credit card issuer 2 subsequently allow the credit card holder 4 to again use the credit card, the monthly contributions and rebate will be renewed subject to the parameters described herein. Similarly, the monthly contribution and rebate from the credit card issuer 2 may be discontinued at any time by the credit card issuer 2 upon not less than a predetermined number of days (e.g., 60) prior written notice to the holder of the credit card. However, in either of the foregoing circumstances, the credit card holder 4, subject to any terms and conditions imposed by the financial institution 6 or by applicable law, may continue to make contributions to the investment account, and shall remain the owner of the investment account and all funds therein.

Should a credit card holder 4 at any time elect to return or not to renew a credit card, the monthly contributions and rebates from the credit card issuer 2 will also immediately cease. In addition, a credit card holder 4 may by not be less than a predetermined number of days (e.g., 15) prior notice to the credit card issuer 2, discontinue the monthly contribution from the credit card issuer 2 on behalf of the credit card holder 4, whereupon the rebates will also automatically terminate. In either of the foregoing instances the credit card holder 4 shall remain the owner of the investment account and all of the funds therein, and may continue to make contributions to the investment account subject to any agreement with the financial institution 6.

In those circumstances where tax-free treatment of amounts accumulating in the investment account is not desired, or wouldn't be affected thereby, the credit card issuer 2 and/or the financial institution 6 may require of the credit card holder a pledge, other security interest, or right of set-off in the investment account to secure, in the case of the credit card issuer 2, amounts which the credit card holder 4 may owe the credit card issuer 2 in respect of the credit card at any time, and in the case of the financial institution 6, other liabilities which the credit card holder 4 may owe the financial institution 6 from time to time.

An additional feature allows the credit card issuer 2 to provide credit to the credit card holder based on the value of the investment fund. In this feature, the credit limit may increase periodically as the value of the fund increases per the contributions made previously.

The system and methods of the preferred embodiment of the present invention described and claimed herein may be carried out by any of various computer based systems known in the prior art and programmed according the methodologies described herein in order to carry out the desired functions.

I claim:

1. A computerized method for providing an investment fund comprising the steps of:
   a) establishing a computerized credit based account with a credit card issuer for the benefit of a credit card holder,
   b) providing a computerized investment account with a financial institution for the benefit of the credit card holder;
   c) determining if the credit card holder has independently deposited funds into the investment account in a particular period;
   d) electronically transferring funds automatically to the computerized investment account by the credit card issuer with a predetermined amount of money specified by the credit card holder on a periodic basis, only when the credit card holder has not independently deposited funds into the investment account in said particular period; and
   e) charging an amount of money so funded against the credit based account of the credit card holder.

2. The method of claim 1 further comprising the step of charging a fee against the credit based account of the credit card holder when the credit card issuer funds the investment account in any given period.

3. The method of claim 1 further comprising the step of billing the credit card holder by the credit card issuer for the amount of money funded to the investment account.

4. The method of claim 3 further comprising the step of terminating funding of the investment account by the credit card issuer when the credit card holder defaults by failing to make timely payment of at least a predetermined portion of the amount billed by the credit card issuer in any particular period.

5. The method of claim 4 comprising the further step of transferring funds from the investment account to the credit card issuer when the credit card holder so defaults, said funds to cover the amount of money owed by the credit card holder to the credit card issuer relating to said default.

6. The method of claim 1 further comprising the steps of:
   e) ascertaining the total amount of money charged by the credit card holder through subscriber merchants in a particular period of time; and
   f) providing a rebate by the credit card issuer to the credit card holder by funding the investment account of the credit card holder with a predetermined percentage of said total amount so ascertained, said rebate not being charged against the credit based account of the credit card holder.

7. The method of claim 6 further comprising the step of billing the credit card holder by the credit card issuer for the amount of money funded to the investment account.

8. The method of claim 7 further comprising the step of terminating funding and rebate provisions of the investment account by the credit card issuer when the credit card holder defaults by failing to make timely payment of at least a predetermined portion of the amount billed by the credit card issuer in any particular period.

9. The method of claim 8 comprising the further step of transferring funds from the investment account to the credit card issuer when the credit card holder so defaults, said funds being sufficient to cover the amount of money owed by the credit card holder to the credit card issuer due to said default.

10. The computerized method of claim 1 wherein the credit card issuer and the financial institution are unrelated parties.

11. A computerized system for providing an investment fund comprising:
   a) means for establishing a computerized credit based account with a credit card issuer for the benefit of a credit card holder;
   b) means for providing a computerized investment account with a financial institution for the benefit of the credit card holder;
   c) means for determining if the credit card holder has independently deposited funds into the investment account in a particular period;
   d) means for electronically transferring funds automatically to the computerized investment account by the credit card issuer with a predetermined amount of money specified by the credit card holder on a periodic basis, only when the credit card holder has not independently deposited funds into the investment account in said particular period; and
   e) means for charging an amount of money so funded against the credit based account of the credit card holder.

12. The computerized system of claim 11 wherein the credit card issuer and the financial institution are unrelated parties.

* * * * *

UNITED STATES PATENT AND TRADEMARK OFFICE
CERTIFICATE OF CORRECTION

PATENT NO. : 5,787,404
DATED : July 28, 1998
INVENTOR(S) : Ernesto Fernandez-Holmann It is certified that error appears in the above-identified patent and that said Letters Patent is hereby corrected as shown below:

Column 8, Claim 6, line 12, subparagraph (e) should be changed to "(f)"
Column 8, Claim 6, line 15, subparagraph (f) should be changed to "(g)"

Signed and Sealed this

Ninth Day of March, 1999

Attest:

Q. TODD DICKINSON

*Attesting Officer*                    Acting Commissioner of Patents and Trademarks